United States Patent
Aphek et al.

(10) Patent No.: US 9,632,509 B1
(45) Date of Patent: Apr. 25, 2017

(54) OPERATING A UAV WITH A NARROW OBSTACLE-SENSOR FIELD-OF-VIEW

(71) Applicant: Dronomy Ltd., Tel Aviv (IL)

(72) Inventors: Ori Aphek, Ramat Gan (IL); Guy Raz, Binyamina (IL)

(73) Assignee: DRONOMY LTD., Tel Aviv (IL)

( * ) Notice: Subject to any disclaimer, the term of this patent is extended or adjusted under 35 U.S.C. 154(b) by 0 days.

(21) Appl. No.: 14/936,699

(22) Filed: Nov. 10, 2015

(51) Int. Cl.
*B64C 39/02* (2006.01)
*G05D 1/10* (2006.01)
*B64D 47/08* (2006.01)
*G05D 1/00* (2006.01)

(52) U.S. Cl.
CPC ............ *G05D 1/101* (2013.01); *B64C 39/024* (2013.01); *B64D 47/08* (2013.01); *G05D 1/0088* (2013.01); *G05D 1/0094* (2013.01)

(58) Field of Classification Search
CPC .... G05D 1/101; G05D 1/0088; G05D 1/0094; B64C 39/024; B64D 47/08
USPC ........................................ 701/2, 3, 11, 26, 18
See application file for complete search history.

(56) References Cited

U.S. PATENT DOCUMENTS

| 5,716,032 | A | 2/1998 | McIngvale | |
| 5,721,691 | A * | 2/1998 | Wuller | G06K 9/00 345/427 |
| 7,228,232 | B2 | 6/2007 | Bodin et al. | |
| 8,400,511 | B2 | 3/2013 | Wood et al. | |
| 8,543,265 | B2 | 9/2013 | Ekhaguere et al. | |
| 2005/0271300 | A1 * | 12/2005 | Pina | G06K 9/4647 382/294 |
| 2008/0059015 | A1 | 3/2008 | Whittaker et al. | |
| 2010/0100269 | A1 * | 4/2010 | Ekhaguere | G05D 1/101 701/26 |
| 2011/0164108 | A1 | 7/2011 | Bates et al. | |
| 2014/0131510 | A1 * | 5/2014 | Wang | B64C 39/024 244/17.23 |
| 2015/0254988 | A1 * | 9/2015 | Wang | G05D 1/0214 701/3 |

(Continued)

FOREIGN PATENT DOCUMENTS

| CN | 104159031 A | * | 11/2014 |
| DE | 102005020594 A1 | | 11/2006 |
| WO | 2006137829 A2 | | 12/2006 |

OTHER PUBLICATIONS

Shen et al., "Autonomous Multi-Floor Indoor Navigation with a Computationally Constrained MAV", 2011 IEEE International Conference on Robotics and Automation ,Shanghai International Conference Center, pp. 20-25, May 9-13, 2011.

(Continued)

*Primary Examiner* — Marthe Marc-Coleman
(74) *Attorney, Agent, or Firm* — D. Kligler IP Services Ltd.

(57) ABSTRACT

A method for autonomously operating an unmanned aerial vehicle (UAV) that includes one or more imaging devices is provided. The imaging devices are pointed away from a direction in which the UAV is flying, and subsequently, an upcoming portion of a current flight path of the UAV is imaged, using the imaging devices. In response to the imaging, an obstacle on the current flight path is detected, and an alternate flight path is planned in response thereto. The UAV is then flown along the alternate flight path, instead of the current flight path. Other embodiments are also described.

22 Claims, 3 Drawing Sheets

(56) References Cited

U.S. PATENT DOCUMENTS

2016/0125746 A1* 5/2016 Kunzi ............... G05D 1/0088
  701/11

OTHER PUBLICATIONS

Shen et al.,"Vision-based state estimation for autonomous rotorcraft MAVs in complex environments", IEEE International Conference on Robotics and Automation (ICRA), pp. 1758-1764, May 6-10, 2013.

Thomas et al., "Control, Estimation, and Planning for Aerial Manipulation", Pen University of Pennsylvania, 51 pages, Jun. 17, 2014.

Shen et al., "Vision Based State Estimation and Trajectory Control Towards High Speed Flight with a Quadrotor", Robotics: Science and Systems, 8 pages, year 2013.

* cited by examiner

OPERATING A UAV WITH A NARROW OBSTACLE-SENSOR FIELD-OF-VIEW

FIELD OF THE INVENTION

Embodiments of the present invention relate to unmanned aerial vehicles (UAVs), also referred to as drones.

BACKGROUND

Various obstacle-avoidance methods and systems have been proposed for unmanned vehicles, such as UAVs.

US Patent Publication 2008/0059015 to Whittaker, whose disclosure is incorporated herein by reference, describes systems, methods, and apparatuses for high-speed navigation, preferably encompassing systems, methods, and apparatuses that provide for autonomous high-speed navigation of terrain by an un-manned robot. By preferably employing a pre-planned route, path, and speed; extensive sensor-based information collection about the local environment; and information about vehicle pose, the robots evaluate the relative cost of various potential paths and thus arrive at a path to traverse the environment. The information collection about the local environment allows the robot to evaluate terrain and to identify any obstacles that may be encountered. The robots thus employ map-based data fusion in which sensor information is incorporated into a cost map, which is preferably a rectilinear grid aligned with the world coordinate system and is centered on the vehicle. The cost map is a specific map type that represents the traversability of a particular environmental area using a numeric value. The planned path and route provide information that further allows the robot to orient sensors to preferentially scan the areas of the environment where the robot will likely travel, thereby reducing the computational load placed onto the system. The computational ability of the system is further improved by using map-based syntax between various data processing modules. By using a common set of carefully defined data types as syntax for communication, it is possible to identify new features for either path or map processing quickly and efficiently.

German Patent Publication DE 102005020594, whose disclosure is incorporated herein by reference, describes an unmanned, remote control helicopter fitted with at least two cameras nominally set with parallel optic axes and with the ability to vary the angle between the optic axes up to 20 deg. The cameras are spaced apart by 5 to 50 cm. and are each fitted with a transmitter and separate remote control, and can be operated in a synchronous manner.

SUMMARY OF THE INVENTION

There is provided, in accordance with some embodiments of the present invention, a method for autonomously operating an unmanned aerial vehicle (UAV) that includes one or more imaging devices. The imaging devices are pointed away from a direction in which the UAV is flying, and subsequently, an upcoming portion of a current flight path of the UAV is imaged, using the imaging devices. In response to the imaging, an obstacle on the current flight path is detected, and in response thereto, an alternate flight path is planned. The UAV is then flown along the alternate flight path, instead of the current flight path.

In some embodiments, imaging the upcoming portion of the current flight path includes imaging the upcoming portion of the current flight path with an angle-of-view that is less than 60 degrees.

In some embodiments, the method further includes reducing a speed of the UAV, and imaging the upcoming portion of the current flight path includes imaging the upcoming portion of the current flight path while the UAV is flying at the reduced speed.

In some embodiments, the method further includes causing the UAV to deviate from the current flight path, and imaging the upcoming portion of the current flight path includes imaging the upcoming portion of the current flight path while the UAV is deviating from the current flight path.

In some embodiments, causing the UAV to deviate from the current flight path includes causing the UAV to deviate in elevation from the current flight path.

In some embodiments, the method further includes, while imaging the upcoming portion of the current flight path, flying the UAV along a portion of the current flight path that is outside a current field-of-view of the imaging devices.

In some embodiments, imaging the upcoming portion of the current flight path includes stereoscopically imaging the upcoming portion of the current flight path, using at least two of the imaging devices.

In some embodiments, the imaging devices are coupled to a main body of the UAV, and pointing the imaging devices away from the direction in which the UAV is flying includes pointing the imaging devices away from the direction in which the UAV is flying by rotating the main body of the UAV.

In some embodiments, rotating the main body of the UAV includes rotating the main body of the UAV about a yaw axis of the UAV.

In some embodiments, rotating the main body of the UAV about the yaw axis of the UAV includes rotating the main body of the UAV about the yaw axis of the UAV by at least 20 degrees.

In some embodiments, pointing the imaging devices away from the direction in which the UAV is flying includes pointing the imaging devices away from the direction in which the UAV is flying while retaining a yaw of the imaging devices with respect to the main body of the UAV.

In some embodiments, pointing the imaging devices away from the direction in which the UAV is flying includes pointing the imaging devices away from the direction in which the UAV is flying by changing a pitch of the imaging devices with respect to the main body of the UAV.

In some embodiments, the UAV further includes a payload imaging device, and the method further includes, while the UAV is flying:

pointing the payload imaging device toward a target, by changing a yaw of the payload imaging device with respect to the main body of the UAV; and subsequently, imaging the target, using the payload imaging device.

In some embodiments, changing the yaw of the payload imaging device with respect to the main body of the UAV includes changing the yaw of the payload imaging device by moving a gimbal.

In some embodiments, the UAV further includes a payload imaging device, and the method further includes, while the UAV is flying, imaging a target, using the payload imaging device.

In some embodiments, pointing the imaging devices away from the direction in which the UAV is flying includes centering a field-of-view of at least one of the imaging devices between (i) the upcoming portion of the current flight path, and (ii) the target.

In some embodiments, the alternate flight path passes between (i) the upcoming portion of the current flight path, and (ii) the target.

In some embodiments, the method further includes imaging the obstacle, using the imaging devices, while flying the UAV along the alternate flight path.

In some embodiments, imaging the obstacle while flying the UAV along the alternate flight path includes imaging the obstacle in response to ascertaining that the obstacle is moving.

In some embodiments, the method further includes, prior to imaging the upcoming portion of the current flight path, adjusting a zoom of the imaging devices, at least in response to a current speed of the UAV.

In some embodiments, imaging the upcoming portion of the current flight path includes imaging the upcoming portion of the current flight path by imaging a portion of a field-of-view (FOV) of the imaging devices, without imaging the entire FOV.

There is further provided, in accordance with some embodiments of the present invention, a method for autonomously operating an unmanned aerial vehicle (UAV) that includes one or more imaging devices. An upcoming portion of a current flight path of the FOV is imaged, by imaging a portion of a field-of-view (FOV) of the imaging devices, without imaging the entire FOV. In response to the imaging, an obstacle on the current flight path is detected, and an alternate flight path is planned in response thereto. The UAV is then flown along the alternate flight path, instead of the current flight path.

There is further provided, in accordance with some embodiments of the present invention, an unmanned aerial vehicle (UAV), which includes one or more imaging devices and a processor. The processor is configured to (i) point the imaging devices away from a direction in which the UAV is flying, (ii) subsequently, image an upcoming portion of a current flight path of the UAV, using the imaging devices, (iii) in response to the imaging, detect an obstacle on the current flight path, and plan an alternate flight path in response thereto, and (iv) fly the UAV along the alternate flight path, instead of the current flight path.

In some embodiments, a yaw of the imaging devices with respect to the main body of the UAV is fixed.

In some embodiments, a pitch of the imaging devices with respect to the main body of the UAV is not fixed.

In some embodiments, at least one of the imaging devices has a resolution that is greater at a center of a field-of-view (FOV) of the imaging device than at an edge of the FOV.

In some embodiments, at least one of the imaging devices has a minimum lateral angle-of-view that is less than a minimum vertical angle-of-view of the imaging device.

In some embodiments, a minimum lateral angle-of-view of at least one of the imaging devices is less than 60 degrees.

In some embodiments, a minimum vertical angle-of-view of at least one of the imaging devices is at least 150% of a minimum lateral angle-of-view of the imaging device.

There is further provided, in accordance with some embodiments of the present invention, a computer software product that includes a tangible non-transitory computer-readable medium in which program instructions are stored. The instructions, when read by a processor of an unmanned aerial vehicle (UAV) that includes one or more imaging devices, cause the processor to (i) point the imaging devices away from a direction in which the UAV is flying, (ii) subsequently, image an upcoming portion of a current flight path of the UAV, using the imaging devices, (iii) in response to the imaging, detect an obstacle on the current flight path, and plan an alternate flight path in response thereto, and (iv) fly the UAV along the alternate flight path, instead of the current flight path.

The present invention will be more fully understood from the following detailed description of embodiments thereof, taken together with the drawings, in which:

DETAILED DESCRIPTION OF EMBODIMENTS

Overview

Embodiments of the present invention provide an autonomous UAV that is used for acquiring images of a target, such as a moving or stationary ground-based target. While flying, the UAV uses a payload imaging device to acquire the images of the target, and also uses one or more other imaging devices for obstacle avoidance.

One hypothetical method of operating such a UAV is to employ, for obstacle avoidance, an imaging device having a fixed, relatively wide field-of-view (FOV), such as a FOV whose lateral and/or vertical angle-of-view is greater than 60 degrees. A disadvantage of this method, however, is that the relatively wide FOV would provide a relatively small detection range, which, in turn, would impose practical limits on the speed of the UAV. (The detection range of an imaging device is the maximum distance from the imaging device at which a minimum required resolution for obstacle detection may be achieved.) In other words, areas that are not relatively close to the UAV would appear in the images with relatively low resolution, thus rendering obstacle detection difficult for such areas; hence, if the UAV were to fly too quickly, the UAV might collide with an obstacle. Although the resolution of the images (and hence, the detection range of the UAV) can be increased by increasing the number of pixels, such a solution typically increases the size, weight, and/or cost of the imaging device, and further increases the power consumption of the UAV.

Although narrowing the FOV would provide greater resolution, a problem would arise in cases in which the UAV is turning and an obstacle is present following the turn. In such cases, the UAV might collide with the obstacle, since the UAV will not be aware of the obstacle until the UAV has already completed the turn and the obstacle is directly in front of the UAV. Hence, even when using a narrower FOV, the UAV speed would need to be limited to enable safe obstacle avoidance.

In light of the above-noted challenges, embodiments of the present invention provide alternate methods for operating the UAV, which increase the maximum speed at which the UAV can safely fly without undesirably increasing the size, weight, cost, or power consumption of the UAV. In some embodiments, the UAV uses a relatively narrow FOV (e.g., a FOV whose lateral and/or vertical angle-of-view is less than 60 degrees), and overcomes the problem noted above by "looking into" upcoming turns in the flight path, by pointing the imaging devices away from the direction in which the UAV is currently flying. For example, the UAV may point the imaging devices by rotating the main body of the UAV to which the imaging devices are coupled. Alternatively or additionally, the UAV may use "windowing," i.e., the UAV may image only a portion of the FOV in which the current flight path lies, thus increasing the rate at which the images are acquired. The increased rate of image acquisition allows the UAV to detect any obstacles along the flight path sooner than the UAV would otherwise have been able to, and hence, the UAV may safely fly at greater speeds.

System Description

Figure 1A:
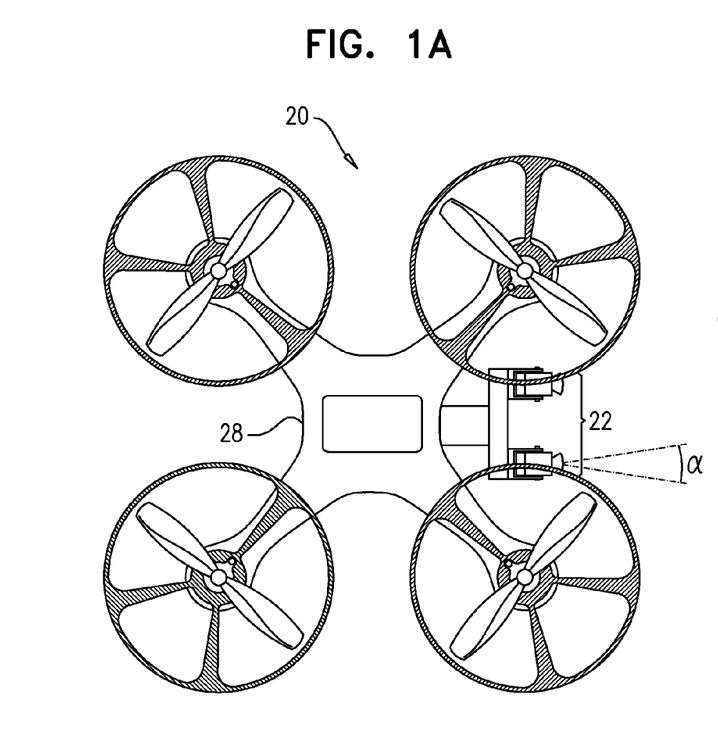
FIGS. 1A and 1B are schematic illustrations of, respectively, a top view and a side view of a UAV, in accordance with some embodiments of the present invention.
Figure 1B:
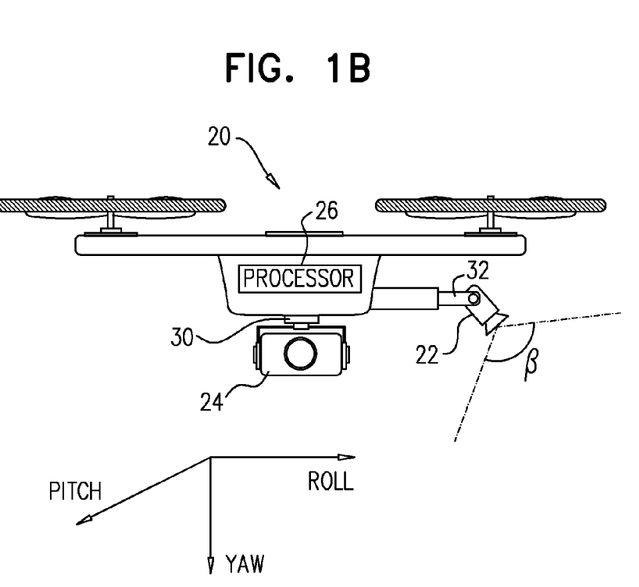

Reference is initially made to FIGS. 1A and 1B, which are schematic illustrations of, respectively, a top view and a side view of a UAV 20, in accordance with some embodiments of the present invention. UAV 20 comprises one or more imaging devices 22, used for obstacle detection. For example, UAV 20 may comprise a plurality of imaging devices, such as the two imaging devices 22 shown in the figures, which collectively perform stereoscopic imaging. Typically, imaging devices 22 are coupled to the main body 28 of the UAV.

In some embodiments, the pitch of the imaging devices with respect to main body 28 is not fixed. For example, as shown in FIG. 1B, the imaging devices may be coupled to main body 28 via a vertical gimbal 32, which controls the pitch of the imaging devices with respect to the main body. (In other words, vertical gimbal 32 controls the orientation of the imaging devices with respect to the pitch axis of the UAV). The controlling of the pitch of the imaging devices helps, for example, landing and takeoff operations, during which the UAV moves vertically.

Alternatively or additionally, the imaging devices may be coupled to main body 28 via a horizontal gimbal, which controls the yaw of the imaging devices with respect to the main body. (In other words, the horizontal gimbal controls the orientation of the imaging devices with respect to the yaw axis of the UAV). In yet other embodiments, the imaging devices are not coupled to any gimbal, and the pitch and yaw of the imaging devices with respect to main body of the UAV are fixed.

Imaging devices 22 may be of any suitable type, and may utilize any suitable imaging modality. For example, imaging devices may comprise one or more "standard" charge coupled device (CCD) or complementary metal oxide semiconductor (CMOS) digital cameras, passive or active night vision cameras, remote sensors such as LIDAR sensors, structured light sensors, or sonar cameras. In some embodiments, a single imaging device is used. For example, a single LIDAR sensor, or a single digital camera (e.g., in combination with optical flow algorithms) may be used. In other embodiments, two or more imaging devices are used, e.g., for stereoscopic imaging. For example, FIG. 2, described below, shows an embodiment in which two imaging devices are used for stereoscopic imaging, such that the respective fields-of-view of the two imaging devices are combined in a single combined field-of-view (FOV) 44.

FIG. 1A shows one of the imaging devices having a lateral (i.e., horizontal) angle-of-view (i.e., FOV angle) alpha, while FIG. 1B shows the same imaging device having a vertical angle-of-view beta. In some embodiments, one or both of the angles-of-view are adjustable, i.e., alpha and/or beta may be adjusted by adjusting the zoom of the imaging devices. In other embodiments, the angles-of-view are fixed. References in the specification and claims to a "minimum" lateral or vertical angle-of-view refer to (i) the angle that is obtained upon maximally laterally or vertically zooming the imaging device, or (ii) if the angle-of-view is fixed, the single, fixed value of the angle-of-view.

In some embodiments, the minimum value of alpha is less than the minimum value of beta for at least one of the imaging devices. For example, whereas the minimum lateral angle-of-view of the imaging device may be less than 50 degrees (e.g., 40 or 30 degrees), the minimum vertical angle-of-view may be greater than 50 degrees, e.g., between 50 and 180 degrees, e.g., 60 degrees. Whereas, as further described below, the yaw of the UAV may be changed mid-flight in order to point the imaging devices toward a particular point, it is typically less practical (and sometimes, impossible) to change the pitch of the UAV mid-flight. Hence, it is advantageous to have a vertical angle-of-view that is greater than the lateral angle-of-view. In any case, both the minimum vertical and minimum lateral angles of view are typically relatively small, in order to achieve a relatively large detection range, as described above.

Notwithstanding the above, in some embodiments, the minimum vertical angle-of-view of the imaging device is significantly greater than the minimum lateral angle-of-view. For example, the minimum vertical angle-of-view may be at least 150% of the minimum lateral angle-of-view. In general, a relatively large vertical angle-of-view may facilitate safe and efficient takeoffs and landings of the UAV.

UAV 20 further comprises a processor 26, configured to process the images from imaging devices 22 and detect obstacles in the images, as well as to perform the various other tasks described herein. For example, as further described hereinbelow with reference to FIG. 2, processor 26 is configured to, in response to ascertaining that an obstacle is in the imaged portion of the UAV's current flight path, plan an alternate flight path, to avoid the obstacle.

Typically, the UAV further comprises a payload imaging device 24, used for imaging a target while the UAV flies. Typically, payload imaging device 24 is coupled to a gimbal 30, which may be used to change the orientation of the payload imaging device with respect to the main body of the UAV. (Gimbal 30 may have one, two, or three degrees of freedom; typically, the number of degrees of freedom of gimbal 30 is a function of the number of degrees of freedom of the orientation of imaging devices 22 relative to the main body of the UAV.) By moving gimbal 30, the payload imaging device is pointed toward the target. Subsequently, the payload imaging device is used to image the target.

Figure 2:
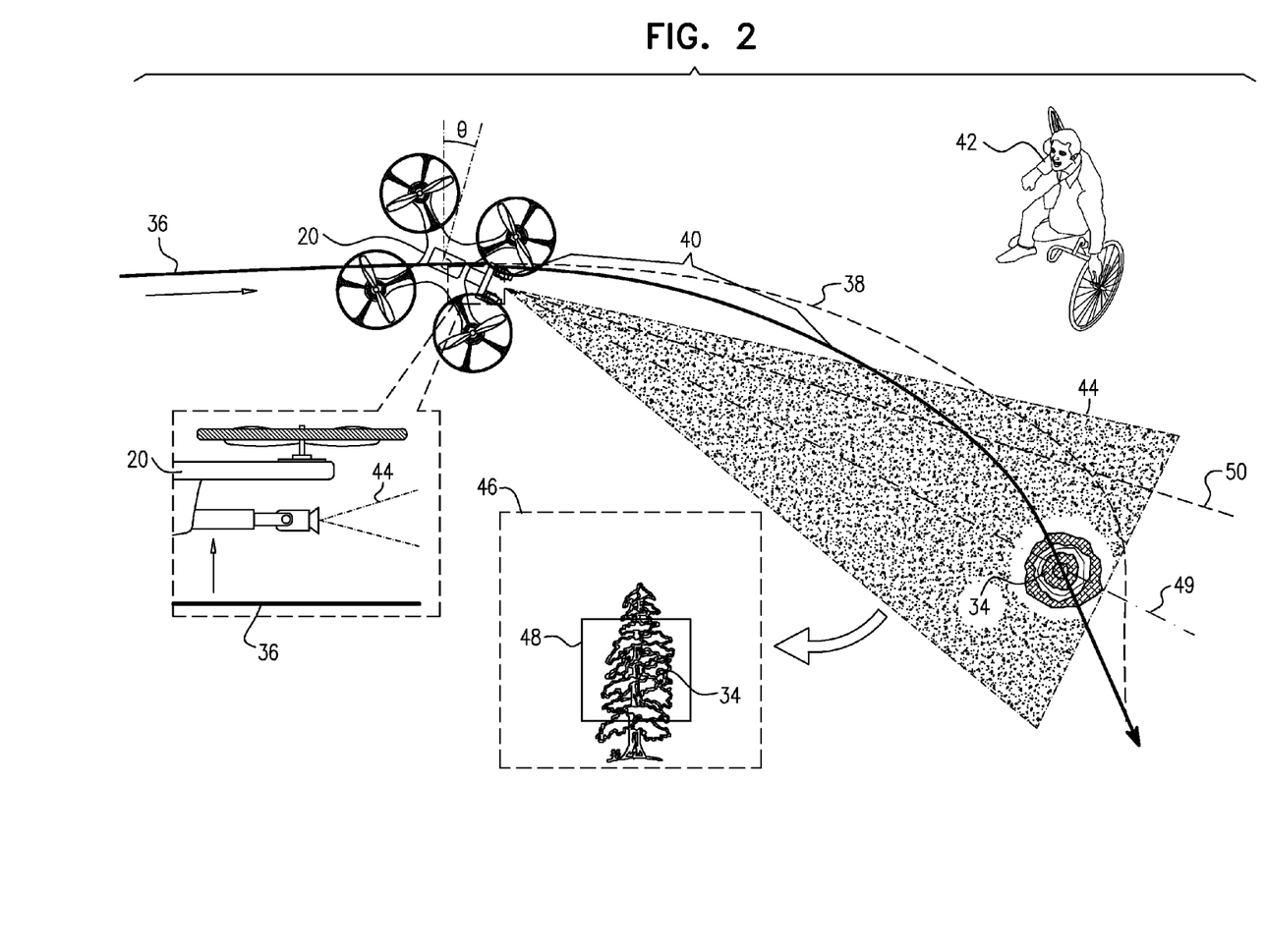
FIG. 2 is a schematic illustration of a method for autonomously or semi-autonomously operating a UAV, in accordance with some embodiments of the present invention.

Reference is now made to FIG. 2, which is a schematic illustration of a method for autonomously or semi-autonomously operating UAV 20, in accordance with some embodiments of the present invention. FIG. 2 shows UAV 20 flying along a flight path 36 toward the right of the page, as indicated by the arrow. (Hence, the portion of flight path 36 to the left of the UAV is the portion along which the UAV has already flown, while the portion of the flight path to the right of the UAV is the portion of the flight path along which the UAV has not yet flown.) The UAV may be configured to fly along flight path 36 by virtue of having been instructed to do so by a user, or by virtue of having computed the path in response to any relevant factors. In any case, flight path 36 is the "current" flight path of the UAV, in the sense that the UAV will continue, by default, to fly along flight path 36, unless, for example, the UAV detects any obstacles along the path.

The UAV looks ahead along the flight path, i.e., images an upcoming portion of the flight path, in order to detect any potential obstacles. The UAV typically uses a relatively narrow FOV, such that the UAV is able to detect obstacles that are some distance away from the UAV. For example, in some embodiments, the UAV is able to detect relatively small obstacles (e.g., telephone wires having a diameter of around 1.5 cm.) that are at least 20 or 30 meters from the UAV.

As noted above, when using a relatively narrow FOV, a challenge is posed by obstacles that are located following a turn. Hence, typically, if there is an upcoming turn in the flight path, the UAV points the imaging devices away from the direction in which the UAV is flying and toward the portion of the flight path that follows the turn. FIG. 2 shows such a scenario, in which the combined FOV 44 of the two imaging devices is pointed away from the current flight direction. In the embodiment shown in FIG. 2, the imaging devices are pointed away from the direction in which the UAV is flying by rotating the main body of the UAV about the yaw axis of the UAV; hence, FIG. 2 shows the UAV rotated about its yaw axis by theta degrees in the clockwise direction. In some cases, theta may be relatively large, e.g., at least 20 degrees, 50 degrees, or more.

As noted above, in some embodiments, the yaw of the imaging devices with respect to the main body of the UAV is fixed, such that the "pointing away" of the imaging devices is accomplished only by virtue of the rotation of the main body of the UAV. Such an embodiment is particularly advantageous for cases in which multiple imaging devices are mounted on a common platform, and used for stereoscopic imaging; in such cases, it may be expensive and/or difficult to configure the common platform to be rotatable with respect to the main body of the UAV.

Alternatively or additionally to pointing the imaging devices away from the current flight direction by changing the yaw of the imaging devices, the imaging devices may be pointed away from the current flight direction by changing the pitch of the imaging devices with respect to the main body of the UAV. Such a change in the pitch of the imaging devices helps the UAV handle upcoming changes in the altitude of the flight path. For example, gimbal 32, shown in FIGS. 1B and 1n the inset portion of FIG. 2, may be used to change the pitch of the imaging devices with respect to the main body of the UAV.

Subsequently to pointing the image devices toward the upcoming portion of the flight path, the imaging devices are used to image (e.g., stereoscopically image) the upcoming portion of the flight path that lies inside the FOV, such that at least one image 46 of the upcoming portion of the flight path is acquired. Processor 26 then processes image 46. If an obstacle 34 is detected in the image, the processor plans an alternate flight path 38, and flies the UAV along alternate flight path 38, instead of the current flight path.

Typically, in cases where the "effective" detection range is less than the "theoretical" detection range, the speed of the UAV is reduced (e.g., the UAV is stopped) while the upcoming portion of the current flight path is imaged, in order to provide the UAV with sufficient time to avoid any upcoming obstacles. For example, the UAV may be slowed or stopped in response to poor visibility conditions, obscurance of the UAV's view of the flight path, or any other situation in which the processor cannot "clear" far enough ahead along the flight path with a sufficient level of confidence.

In some embodiments, the processor identifies a portion 48 of the FOV of the imaging devices within which the upcoming portion of the current flight path of the UAV lies. The processor then uses the imaging devices to image the upcoming portion of the current flight path by imaging portion 48, without imaging the entire FOV. If no obstacle is found within portion 48, the UAV continues along the current flight path. Otherwise, the processor plans, and subsequently flies the UAV along, an alternate flight path. (In some cases, in order to plan the alternate flight path, the processor first acquires an image of the entire FOV, or at least of a larger portion of the FOV.) In general, the imaging of only portion 48, rather than of the entire FOV, facilitates a higher frame rate, lower power consumption, and/or faster image processing.

The windowing technique described above, by which only the most relevant portion of the FOV is imaged, may be practiced with embodiments in which a relatively narrow FOV is used. Alternatively, windowing may be used with wider fields-of-view. For example, instead of using a relatively small vertical angle-of-view, which may necessitate changing the pitch of the imaging devices to look ahead along the flight path (as described above) if the flight path changes in altitude, a larger vertical angle-of-view may be used, thus allowing the UAV to see the upcoming portion of the flight path without changing the pitch of the imaging devices. Since, however, a wider FOV provides less resolution (and hence, a smaller detection range), it may be necessary to increase the number of pixels. By using windowing to image only the most relevant portion of the FOV, the number of pixels (and hence, the detection range) may be increased, without overly decreasing the frame rate.

Similarly, instead of using a relatively small lateral angle-of-view, which may necessitate changing the yaw of the UAV to point the imaging devices toward an upcoming portion of the flight path (as illustrated in FIG. 2), a larger lateral angle-of-view may be used with an increased number of pixels, and windowing may be used to image the upcoming portion of the flight path without imaging the entire FOV.

It is noted that windowing may be purely horizontal, purely vertical, or, as shown in FIG. 2, both horizontal and vertical.

In some embodiments, the UAV images the upcoming portion of the current flight path while the UAV is deviating from the current flight path. For example, as shown in the inset portion of FIG. 2, the UAV may deviate in elevation from the current flight path, such as by rising a particular elevation from the current flight path. (This is depicted in the inset portion of FIG. 2 by the upward-pointing arrow.) Deviating from the flight path may allow the UAV to get a better view of the upcoming portion of the flight path, relative to if the UAV were to remain on the flight path while imaging.

In some cases, as a result of pointing the imaging devices away the current direction of flight, the UAV flies along a portion 40 of the current flight path that is outside FOV 44, while imaging the upcoming portion of the current flight path. Since portion 40 was recently "checked" for obstacles, there is relatively little risk that an obstacle is present in portion 40. Hence, there is no need to include portion 40 within the FOV of the imaging devices.

In some cases, as shown in FIG. 2, the imaged upcoming portion of the flight path is at a distance from the UAV that is close to the theoretical detection range of the UAV. (The theoretical detection range is depicted in FIG. 2 by the base of the triangle that depicts FOV 44.) In other cases (e.g., when the UAV's line of sight is blocked), the imaged upcoming portion of the flight path is at a lesser distance from the UAV. As noted above, in such cases, the UAV is typically slowed, in order to accommodate the smaller effective detection range.

Typically, the FOV of at least one of the imaging devices (e.g., combined FOV 44 of the imaging devices) is centered on the upcoming portion of the flight path. This is depicted in FIG. 2 by a FOV-center-line 49, which intersects flight path 36. In some cases, however, the FOV may be otherwise centered. For example, the FOV may be centered between (i) the upcoming portion of the current flight path, and (ii) the target 42, as depicted in FIG. 2 by an alternative FOV-center-line 50. This allows the alternate flight path to be more strategically, and/or efficiently, planned. (In this context, the alternate flight path is more "strategic" if it passes between the upcoming portion of the current flight path and the target, such that the obstacle cannot inhibit the imaging of the target.) For example, in the scenario shown in FIG. 2, target 42 is to the left of the current flight path, such that it is more advantageous to bypass obstacle 34 on the left, rather than on the right, since, if the obstacle were bypassed on the right, the obstacle might obscure the line of sight of the payload imaging device. The centering of the FOV to the left of the current flight path thus provides a relatively large portion of image 46 for planning the alternate flight path. If, on the other hand, the FOV were centered on the current flight path, the UAV might be forced to bypass the obstacle on the right, thus potentially inhibiting the imaging of the target. (Alternatively, the UAV might need to subsequently acquire one or more additional images, in order to plan a left-bypass of the obstacle.)

In some embodiments, while flying along the alternate flight path, the UAV continues to image the obstacle, using imaging devices 22. For example, the UAV may continue to image the obstacle in response to ascertaining that the obstacle is a moving obstacle, e.g., another UAV. In general, continuing to image the moving obstacle may help avoid a collision with the obstacle. (For a stationary obstacle, it is typically less helpful to continue imaging the obstacle, and hence, such continued imaging is typically not performed.)

Figure 3:
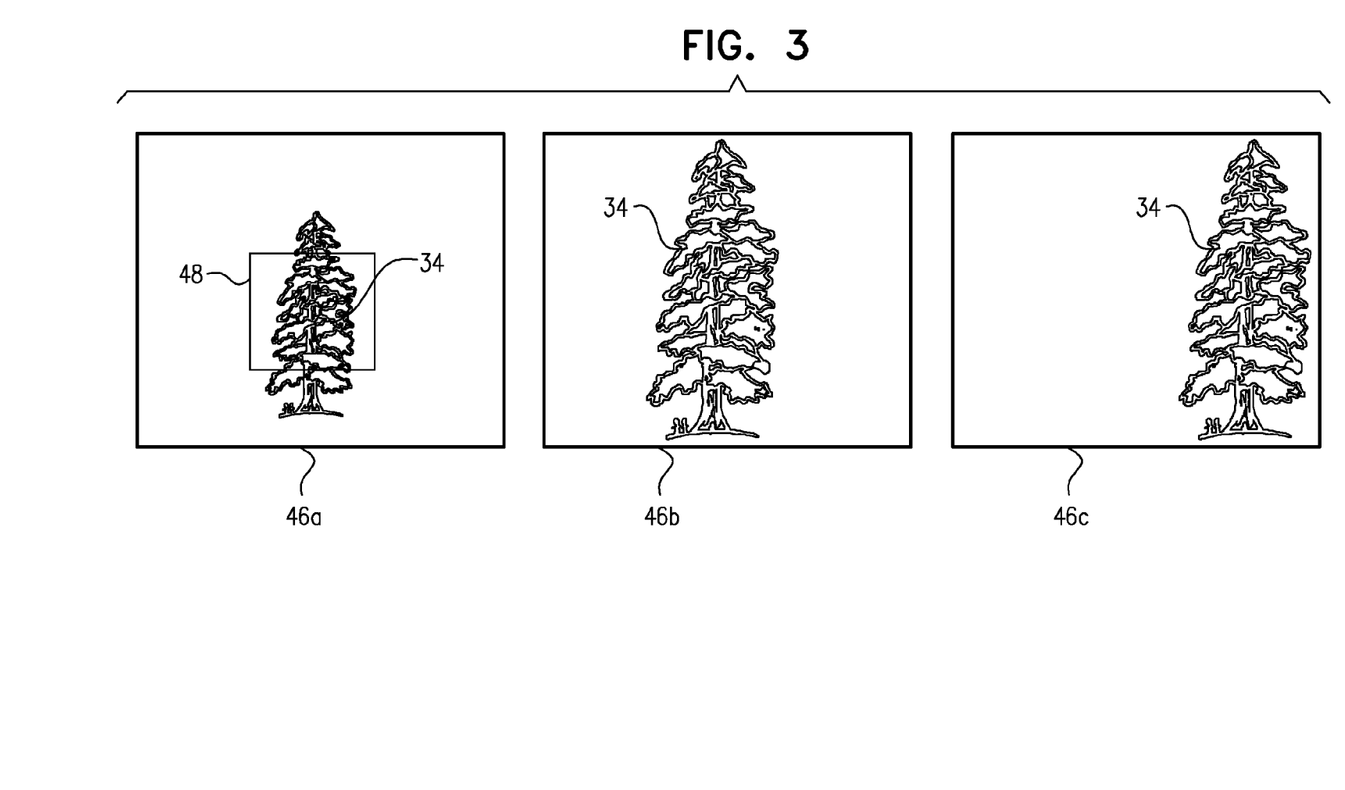
FIG. 3 is a schematic illustration of respective images, acquired in accordance with some embodiments of the present invention.

Reference is now made to FIG. 3, which is a schematic illustration of respective images 46a, 46b, and 46c, acquired in accordance with some embodiments of the present invention.

In general, an advantage of imaging with a narrower FOV is that a narrower FOV provides a greater detection range, which, in turn, facilitates the flying of the UAV at a greater speed. (Furthermore, in some cases, e.g., when using stereoscopic imaging, images acquired using a narrower FOV exhibit less distortion, and hence, less processing power may be required to process the images. Furthermore, images acquired using a narrower FOV may be less affected by temperature.) On the other hand, once an obstacle is detected, it is more difficult to plan an alternate flight path to bypass the obstacle, since the image shows a narrower view of the area around the obstacle.

In light of the above-described tradeoff, if the UAV is forced to reduce its speed (e.g., due to limited visibility), it may be advantageous to widen the FOV (i.e., zoom out), since the primary advantage of the narrower FOV (i.e., the increased speed of the UAV) is in any case not being realized. Hence, in some embodiments, the FOV is adjustable, and processor 26 adjusts the zoom (and hence, FOV) of the imaging devices prior to imaging the upcoming portion of the current flight path, at least in response to the current speed of the UAV. For example, the width of the FOV may be generally set such as to obtain the minimum detection range required by the current speed. If the speed of the UAV increases, the processor narrows the FOV; conversely, if the speed of the UAV decreases, the processor widens the FOV.

The scope of the present invention includes using any relevant width of FOV for imaging the upcoming portion of the flight path. Images 46a and 46b in FIG. 3 provide two purely illustrative examples of images acquired with different fields-of-view. Image 46a is generally the same as image 46 shown in FIG. 2; for example, image 46a may be acquired with lateral and vertical angles-of-view of, respectively, 50 and 100 degrees. Image 46b is acquired with a narrower FOV (i.e., a higher zoom); for example, image 46b may be acquired with lateral and vertical angles-of-view of, respectively, 30 and 60 degrees. (Hence, obstacle 34 appears larger in image 46b than in image 46a.)

In other embodiments, the width of the FOV is fixed, and processor 26 controls the speed of the UAV, based on the width of the FOV. For example, the processor may generally fly the UAV at the maximum speed that is allowed by the detection range provided by the fixed FOV (unless, for example, the FOV is currently obscured, such that the effective detection range is smaller than the theoretical detection range).

Alternatively or additionally to adjusting the FOV of the imaging devices, the above-described tradeoff may be managed by using one or more imaging devices having a wider FOV (e.g., a FOV having a lateral angle-of-view of 90-120 degrees) together with one or more imaging devices having a narrower FOV (e.g., a FOV having a lateral angle-of-view of 30-40 degrees). The narrower-FOV images are used for obstacle detection, while the wider-FOV images are used for planning the alternate flight path.

In yet other embodiments, the above-described tradeoff is managed by at least one of the imaging devices having a resolution that is greater at a center of the FOV of the imaging device than at an edge of the FOV. For example, at least one of the imaging devices may comprise a fisheye lens having a greater angular resolution at the center of the lens than at the edges of the lens. Such a lens provides a relatively large detection range at the center of the FOV, thus facilitating a higher flying speed (assuming the center of the FOV is used to image the upcoming portion of the flight path), yet does not overly compromise the processor's ability to plan an alternate flight path. In other words, such a lens provides benefits of both a narrower FOV and a wider FOV.

Image 46c shows an image that would result from centering the FOV between the current flight path and the target, as described above with reference to FIG. 2. In other words, if FOV 44 were to be centered along alternative FOV-center-line 50, as shown in FIG. 2, the flight path (and obstacle) would appear toward the right edge of the image, thus providing a large portion of the image that may be used to plan an alternate flight path that passes between the obstacle and the target.

In general, processor 26 may be embodied as a single processor, or a cooperatively networked or clustered set of processors. In some embodiments, one processor performs the processing of the images, while another processor performs flight-path planning. Processor 26 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein. In some embodiments, processor 26 comprises specialized circuitry such as a graphics processing unit (GPU), a digital signal processor (DSP), and/or a field-programmable gate array (FPGA).

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for autonomously operating an unmanned aerial vehicle (UAV), the method comprising:
    pointing one or more imaging devices, which are coupled to the UAV and are used by the UAV for obstacle detection and avoidance, away from a first portion of a current flight path of the UAV that was already checked for obstacles, such that the first portion of the current flight path is outside a current field-of-view of the imaging devices;
    subsequently, while the imaging devices are pointed away from the first portion of the current flight path, imaging, using the imaging devices, a second, upcoming portion of the current flight path of the UAV, while flying the UAV along the first portion of the current flight path;
    in response to the imaging, detecting an obstacle on the second, upcoming portion of the current flight path, and planning an alternate flight path in response thereto; and
    subsequently, flying the UAV along the alternate flight path, instead of the current flight path.

2. The method according to claim 1, wherein imaging the upcoming portion of the current flight path comprises imaging the upcoming portion of the current flight path with an angle-of-view that is less than 60 degrees.

3. The method according to claim 1, wherein the imaging devices are coupled to a main body of the UAV, and wherein pointing the imaging devices away from the first portion of the current flight path comprises pointing the imaging devices away from the first portion of the current flight path by rotating the main body of the UAV.

4. The method according to claim 3, wherein rotating the main body of the UAV comprises rotating the main body of the UAV about a yaw axis of the UAV.

5. The method according to claim 1,
    wherein the method further comprises, while the UAV is flying, imaging a target, using a payload imaging device that is coupled to the UAV and is not one of the imaging devices used for obstacle detection and avoidance.

6. The method according to claim 5, wherein pointing the imaging devices away from the first portion of the current flight path comprises centering a field-of-view of at least one of the imaging devices between (i) the upcoming portion of the current flight path, and (ii) the target.

7. The method according to claim 5, wherein the alternate flight path passes between (i) the upcoming portion of the current flight path, and (ii) the target.

8. The method according to claim 1, further comprising imaging the obstacle, using the imaging devices, while flying the UAV along the alternate flight path.

9. The method according to claim 8, wherein imaging the obstacle while flying the UAV along the alternate flight path comprises imaging the obstacle in response to ascertaining that the obstacle is moving.

10. The method according to claim 1, further comprising, prior to imaging the upcoming portion of the current flight path, adjusting a zoom of the imaging devices, at least in response to a current speed of the UAV.

11. The method according to claim 1, wherein imaging the upcoming portion of the current flight path comprises imaging the upcoming portion of the current flight path by imaging a portion of a field-of-view (FOV) of the imaging devices, without imaging the entire FOV.

12. The method according to claim 1, wherein the second, upcoming portion of the current flight path follows an upcoming turn in the current flight path.

13. The method according to claim 1, wherein the pointing comprises pointing the imaging devices away from the first portion of the current flight path such that the first portion of the current flight path is not within the current field-of-view of any imaging device that is coupled to the UAV.

14. Apparatus, comprising:
    an unmanned aerial vehicle (UAV), comprising a processor; and
    one or more imaging devices, which are coupled to the UAV and are used by the UAV for obstacle detection and avoidance,
    the processor being configured to:
        point the imaging devices away from a first portion of a current flight path of the UAV that was already checked for obstacles, such that the first portion of the current flight path is outside a current field-of-view of the imaging devices,
        subsequently, while the imaging devices are pointed away from the first portion of the current flight path, image, using the imaging devices, a second, upcoming portion of the current flight path of the UAV, while flying the UAV along the first portion of the current flight path,
        in response to the imaging, detect an obstacle on the second, upcoming portion of the current flight path, and plan an alternate flight path in response thereto, and
        subsequently, fly the UAV along the alternate flight path, instead of the current flight path.

15. The apparatus according to claim 14, wherein the imaging devices are coupled to a main body of the UAV, and wherein the processor is configured to point the imaging devices away from the first portion of the current flight path by rotating the main body of the UAV.

16. The apparatus according to claim 15, wherein a yaw of the imaging devices with respect to the main body of the UAV is fixed.

17. The apparatus according to claim 14, wherein the imaging devices have an adjustable zoom, and wherein the processor is further configured to, prior to imaging the upcoming portion of the current flight path, adjust the zoom of the imaging devices, at least in response to a current speed of the UAV.

18. The apparatus according to claim 14, wherein at least one of the imaging devices has a resolution that is greater at a center of a field-of-view (FOV) of the imaging device than at an edge of the FOV.

19. The apparatus according to claim 14, wherein a minimum lateral angle-of-view of at least one of the imaging devices is less than 60 degrees.

20. The apparatus according to claim 14, wherein the second, upcoming portion of the current flight path follows an upcoming turn in the current flight path.

21. The apparatus according to claim 14, wherein the processor is configured to point the imaging devices away from the first portion of the current flight path such that the first portion of the current flight path is not within the current field-of-view of any imaging device that is coupled to the UAV.

22. A computer software product comprising a tangible non-transitory computer-readable medium in which program instructions are stored, which instructions, when read by a processor of an unmanned aerial vehicle (UAV), cause the processor to:

point one or more imaging devices, which are coupled to the UAV and are used by the UAV for obstacle detection and avoidance, away from a first portion of a current flight path of the UAV that was already checked for obstacles, such that the first portion of the current flight path is outside a current field-of-view of the imaging devices, subsequently, while the imaging devices are pointed away from the first portion of the current flight path, image, using the imaging devices, a second, upcoming portion of the current flight path of the UAV, while flying the UAV along the first portion of the current flight path, in response to the imaging, detect an obstacle on the second, upcoming portion of the current flight path, and plan an alternate flight path in response thereto, and subsequently, fly the UAV along the alternate flight path, instead of the current flight path.

* * * * *